United States Patent [19]

Magrane et al.

[11] 4,345,553
[45] Aug. 24, 1982

[54] MULTIPLE STEP ADVANCE WITH MAGNETIC TRIGGER ROTOR

[75] Inventors: Robert T. Magrane, Reno, Nev.; Nando A. Fontana, West Springfield, Mass.

[73] Assignee: Eltra Corporation, Toledo, Ohio

[21] Appl. No.: 133,771

[22] Filed: Mar. 25, 1980

[51] Int. Cl.³ .............................................. F02P 3/06
[52] U.S. Cl. ................................ 123/149 C; 123/602; 123/149 D; 310/70 R; 310/153
[58] Field of Search ............... 123/602, 149 C, 149 F, 123/149 D, 149 R, 418, 617; 310/70 R, 70 A, 153, 156, 111; 29/420

[56] References Cited

U.S. PATENT DOCUMENTS

| 2,325,927 | 8/1943 | Wilbur | 310/111 |
| 3,619,634 | 11/1971 | Burson | 123/602 |
| 3,961,618 | 6/1976 | Swift | 123/602 |

FOREIGN PATENT DOCUMENTS

769548 11/1971 Belgium ................................ 29/420

Primary Examiner—Charles J. Myhre
Assistant Examiner—Andrew M. Dolinar
Attorney, Agent, or Firm—James P. DeClercq

[57] ABSTRACT

An ignition system for a small internal combustion engine is disclosed, including a magnetic trigger rotor (33) having two magnets (45) disposed in arcuate slots (43), with a radial slot (41) disposed between the arcuate slots (43) for causing an abrupt flux reversal in a pickup coil (35) to generate an initial ignition timing signal, and two or more holes (47), (49) adjacent the radial slot and made in the direction of the axis of rotation of the rotor, for causing flux distortions which becomes significant at higher rotational speeds, to give a step-type ignition advance. Also disclosed are charging coils (21) for charging a capacitor (C1) in a capacitor discharge ignition system, which are part of a separate assembly than generating coils (23) usable for powering lights and other accessories on a vehicle equipped with an engine having an ignition system according to the invention, which are a separate assembly, so that such an ignition system may be provided without generating coils for applications where they are not required. Charging coils (21) and generating coils (23) are in separate semicircular assemblies, and are initially produced by making a circular assembly, and severing it into sections.

11 Claims, 11 Drawing Figures

MULTIPLE STEP ADVANCE WITH MAGNETIC TRIGGER ROTOR

The instant invention relates to ignition systems for small internal combustion engines. In particular, the invention relates to such an ignition system utilizing a magnetic trigger rotor having a plurality of holes near its periphery for generating advanced ignition signals.

BACKGROUND OF THE INVENTION

Numerous attempts have been made to provide an ignition system with some form of advance at higher engine speeds for use in engines such as are used on snowmobiles, outboard motors, and the like, where improved performance at higher engine speed is desirable, and fuel consumption and duration of operation make improvements in fuel economy desirable. Some such systems have been mechanical, and provide an ignition advance proportional to engine speed, or to throttle position, many have borrowed from the historical technique for measuring speed of a rotating device, using a magnetic pickup sensing the passage of gear teeth or the passage of a projection on a shaft, to generate a voltage related to the rotational speed of the gear or shaft. Rotating discs have been provided with projecting ramps tapering in both width and height, square and round pins or various heights and lengths protruding from the rim or face of a rotating member, and other configurations, complex to manufacture, cumbersome to assemble and expensive to produce.

U.S. Pat. No. 3,619,634 is exemplary of such attempts. U.S. Pat. No. 3,619,634, issued to Bob O. Burson on Nov. 9, 1971, entitled "ALTERNATOR AND COMBINED BREAKERLESS IGNITION SYSTEM" discloses a capacitive discharge ignition system for an engine, the triggering of the ignition system to fire the associated spark plug being achieved by a magnetic pickup, sensing irregularities such as pins on the outer surface of the rim of the rotor. The irregularities take the form of a ramp, non-linearly tapered in height and width, and which may be proceeded by a rectangular projection, a series of rectangular projections or ribs of equal height and unequal width, as well as series or recesses of decreasing size formed in the outer rim surface. Such rotors, used with conventional magnetic pickup, are more difficult to manufacture than gears, for the reasons that the teeth, recesses or projections are not identical, and require complex machining operations to provide the accurate surfaces necessary to provide repeatable air gaps.

U.S. Pat. No. 3,961,618, issued to Swift on June 8, 1976, entitled "SMALL ENGINE IGNITION SYSTEM WITH SPARK ADVANCE", assigned to the instant assignee, discloses the use of an eccentric magnetic rotor, with a radial slot to accentuate flux reversal, and a radial notch spaced from the radial slot for providing an advance trigger signal. The radial notch is of complex shape, having a sloped trailing edge, apparently to prevent the generation of a pulse by the trailing edge, which could result in false triggering.

The instant overcomes numerous deficiencies of prior attempts to provide similar results.

SUMMARY OF THE INVENTION

It is a principle object of the invention to produce an ignition system for a small internal combustion engine, such as used in snowmobiles an outboard motors, with a step advance which is simple and convenient to manufacture, and reliable in operation.

It is further object of the invention to produce a rotor for use in an ignition system which provides a multiple step ignition advance operative at increased engine speeds together with a signal of larger magnitude to provide an ignition signal for starting and idling such an engine.

It is a further object to produce such a rotor wherein the stepped advance feature may be implemented in a single production step, together with the production of the rotor.

It is a further object of the invention to produce an ignition system for small internal combustion engine which includes separate generating means for producing power to operate the ignition system and for producing power to operate accessories on the vehicle in which the motor is used, so that accessory-powering structure need not be provided for a motor to be used in a vehicle where it is not needed, but may be added at a subsequent time.

DETAILED DESCRIPTION OF THE INVENTION

Figure 1:
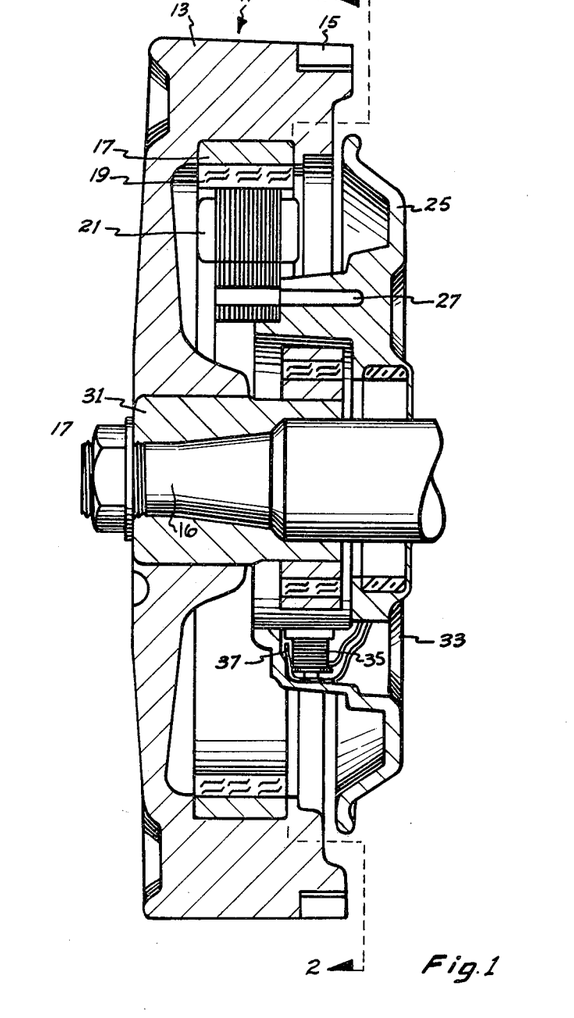
FIG. 1 is a side-elevational view, partially in section, showing an alternator having an ignition system with a rotor, and capacitor charging and generating coils, in accordance with the present invention.
Figure 2:
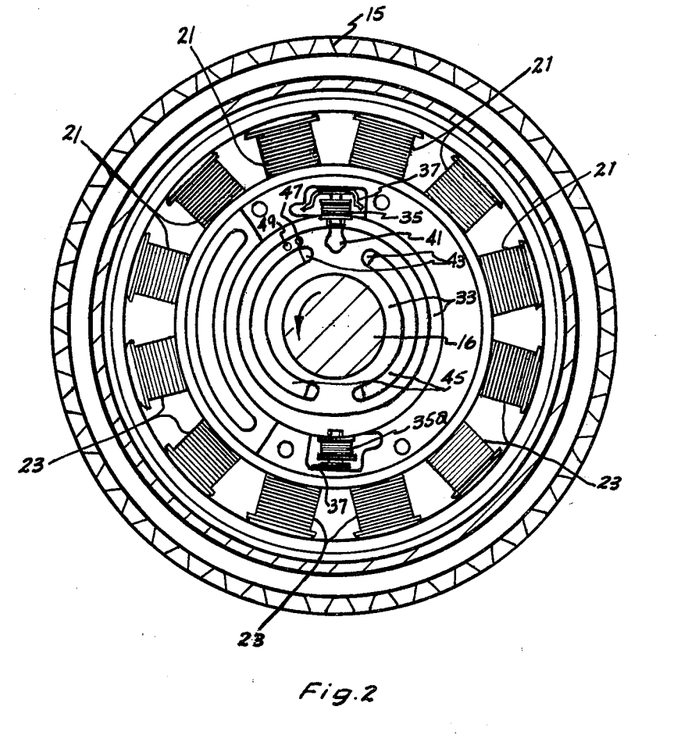
FIG. 2 is a bottom elevational view, partially in section, showing the alternator of FIG. 1, taken along line 2—2 in FIG. 1.

FIGS. 1 and 2 show views of an alternator according to the invention, taken along lines to most clearly and accurately represent the invention. An alternator, generally represented as 11, has a flywheel 13 provided with gear teeth 15 adapted to cooperate with a starter motor, not shown, and is retained to a shaft 16 of an engine, not shown, by nut 17. In the preferred embodiment, flywheel 13 is made of non-magnetic material. It should be noted that the embodiment of flywheel 13 illustrated is best adapted for use with a hand-started motor, having gear teeth 15 integrally cast with rotor 13. To better understand the engagement shock of an electrical starter, gear 15 may be made from a harder material than that used for flywheel 13, and retained in place in a conventional manner, such as press fitting or shrink fitting.

Flywheel 13 is provided with a ring-shaped flux-shunt 17, and a ring-shaped magnet 19. In the preferred embodiment, magnet 19 is magnetized in twelve separate sections, each section having a direction of magnetism radial to shaft 16, alternate sections having alternate magnetic polarity. In the preferred enbodiment, magnet 19 is made from an elastomeric material filled with a magnetic material, such as nitrile rubber filled with barium ferrite. Magnet 19 is rotated past stationary coils 21 and 23 to generate electrical power, as will be further described below. Coils 21 are used to generate power to operate an ignition system according to the invention. Coils 23 are use to charge a battery to provide power for accessories on the vehicle in which an engine including features according to the invention is used. Coils 21 and 23 form a two-section stator assembly, attached to stationary housing 25 by fastening means 27. Housing 25 may be attached to an engine in any convenient conventional fashion, or may be formed as part of the engine. A rotor support member 31 is, in the preferred embodiment, cast with flywheel 13, to support a generally disk shaped eccentric magnetic trigger rotor 33 pressed onto member 31, member 31 also serving to mount flywheel 13 to shaft 16. One or more trigger coils 35 and 35a cooperate with magnetic rotor 33 to provide timing signals to synchronize an ignition system according to the invention with the operation of pistons in the engine. Trigger coils 35 and 35a are fastened to housing 25 in conventional manner, and are provided with a flux shield 37 to isolate trigger coils 35 and 35a from flux generated by magnet 19, to prevent magnetic fields used in generating power from affecting the timing of the ignition system.

In the preferred embodiment, charging coils 21 are wound in series, with adjacent coils being wound in opposite directions. When circular magnet 19, magnetized in sections having opposite polarity, corresponding in spacing to the spacing of charging coils 21, is rotated past charging coils 21, an alternating current waveform will be generated. As will be further explaned below, the preferred embodiment of the invention includes six charging coils 21. It may also include six generating coils 23, wound in series so as to generate a lower voltage than generated by charging coils, but at a substantially higher current. Generating coils 23 are separate from charging coils 21, so that generating coils 23 need not be provided with engines to be used in applications where generating capacity is unnecessary, such as in an unlighted boat, in an engine to be used with a portable electrical generator, or to power tools and the like. It should be apparent that by providing separate charging coils and generating coil assemblies, the winding of such coils may be greatly simplified, and performed with greater ease, as well as resulting in a more economical unit.

Figure 3:
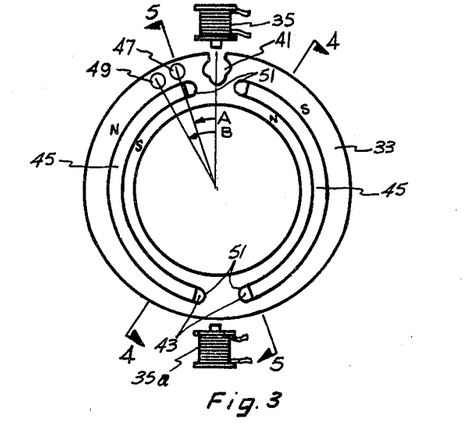
FIG. 3 is a top-elevational view showing a rotor in accordance with the invention.

As shown in FIGS. 2 and 3, rotor 33 is eccentric, and has a radial slot 41 in its periphery at the furthest point from the axis of rotation of shaft 16. On either side of slot 41, arcuate slots 43 are formed in the rotor. Magnetic means 45 are disposed in each of two arcuate slots 43, and are magnetized radially, so that the outer periphery of rotor 33 on one side of the slot 41 has a first magnetic polarity, and the periphery of rotor 33 on the other side of slot 41 has the opposite polarity. In the preferred embodiment magnetic means 45 are strips of elastomeric material, impregnated or filled with a stable magnetic material. In an illustrative embodiment, the elastomeric material is nitrile rubber, and the magnetic material is barium ferrite. As should be apparent, this greatly simplifies the assembly of a timing rotor, since such a magnetic means 45 is flexible and resilient, and can be inserted into slots 43 and retained there by its own resiliency, eliminating the need for any other means of holding it in place, as well as eliminating the cost of conventional magnets and overcoming the fact that conventional magnets are brittle and are apt to be broken while being inserted in such a slot.

A timing rotor according to the preferred embodiment of the invention includes two circular apertures or recesses, such as holes 47 and 49, adjacent the radial slot and spaced apart from each other, and parallel to the axis of rotation of shaft 16. In conjunction with radial slot 41, circular recesses or apertures such as holes 47 and 49 yield an ignition timing that will support the operation of the engine when it is being started, and when it is being operated at low rotational speed, as well as providing advanced ignition timing for better performance and fuel economy when it is being operated at a higher rotational speed. It will of course, be obvious that shaft 16 is associated with the crank shaft of an engine, which in turn is associated with the pistons of the engine, so that the position of rotor 33 is related to the position of a piston within the engine. In the embodiment illustrated, there are two trigger coils 35 and 35a, in a system intended to be used with a two cylinder engine, with two ignition coils and two spark plugs.

The illustrated embodiment of the invention is adapted to operate a two-cycle engine, with a shaft 16 being part of the crank shaft of the engine. Obviously the same mechanical structure as illustrated could be used with a four cycle engine, with appropriate gearing between shaft 16 and the crank shaft of the engine, and that more than two cylinders could be operated, since it does neither good nor harm to fire a spark plug in a cylinder as the piston approaches the top of a cylinder on an exhaust stroke, so that a spark plug can be allowed to fire twice during a four stroke cycle, one such firing having no effect other than a relatively insignificant utilization of energy. Additional coils 35 or 35a may be added, as desired, to provide for a greater number of engine cylinders.

The eccentric shape of rotor 33 cooperates with radial slot 41 to generate the greatest possible trigger signal for starting an engine, as will as insuring that only one coil 35 or 35a will be energized at a time, and that the engine will not start in reverse. As rotor 33 rotates past a trigger coil 35, the coil will be subjected to a gradually increasing flux, of a first magnetic polarity. At low speed, holes 47 and 49 have no significant effect on this gradually increasing amount of flux. Then, as slot 41 passes beneath trigger coil 35 and 35a, the flux through trigger coil 35 or 35a suddenly becomes a maximum in the opposite polarity. This abrupt change in flux level, of twice the flux level of a single magnetic means 45, creates a voltage in trigger coil 35 or 35a that is sufficient to provide a trigger signal of maximum magnitude to insure reliable ignition triggering during the cranking and starting of an engine.

The eccentric shape of rotor 33 also prevents the engine from starting in the reverse direction by generating a single voltage pulse in coil 35 or 35a in a polarity incapable of causing an ignition pulse. Other approaches generate both leading and trailing edge pulses, one of which could cause reverse ignition pulses.

Circular recesses or apertures such as holes 47 and 49 becomes effective to the timing when engine speed increases, increasing the rotational velocity of rotor 33. By inspection of the drawings, it can be seen that holes 47 and 49 serve to deflect flux around their periphery, being of higher reluctance than the material of rotor 33, concentrating flux on either side of the hole. Hole 49, being smaller than hole 47 in the preferred embodiment, has a lesser effect on flux. When this distorted flux pattern passes through trigger coil 35 or 35a at a sufficiently high speed, this small change in flux in trigger coil 35 or 35a in a short period of time will generate a voltage high enough to serve as a trigger signal. The subsequent trigger signal caused by the flux reversal at slot 41 will be ignored, the ignition system not having had sufficient time to recharge, or if it has, a second ignition pulse is of no effect. As rotational speed further increases, the small distortion in flux pattern caused by hole 49, passing through trigger coil 35 in a sufficiently short time, will generate a sufficiently high voltage in trigger coil 35 to serve as a trigger signal. Subsequent larger, trigger signals due to hole 47 and slot 41 will again be ignored. The operation of an embodiment of the invention will be further described below.

FIG. 3 shows rotor 33 in greater detail. In an actual embodiment of the invention, arcuate slots 43 have rounded ends 51, while magnetic means 45 are square-ended strips, with the advantage noted above. In the illustrated embodiment, hole 47 is drilled through magnetic rotor 33, and has a diameter of 0.093 inches (0.024 cm) and is spaced an angle A of 17 degrees from the center of radial slot 41. Hole 49 has a diameter of 0.101 inches (0.026 cm), and is spaced at angle B of 31 degrees from the center of radial slot 41.

Figure 4:
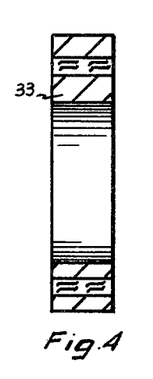
FIG. 4 is shows a rotor according to the invention taken along line 4—4 in FIG. 3.
Figure 5:
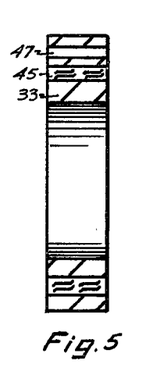
FIG. 5 shows a rotor according to the present invention taken along line 5—5 in FIG. 3.
Figure 5A:
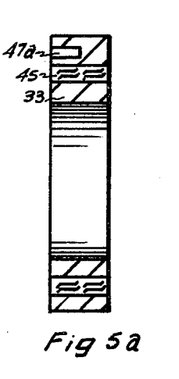
FIG. 5a shows an alternate embodiment of the rotor shown in FIG. 5.

FIGS. 4 and 5 are sectional view of a rotor 33 taken along lines 4—4 and 5—5 in FIG. 3, respectively. FIG. 5a is a sectional view similar to that of FIG. 5, showing a recess designated 47a, which does not extend through the thickness of rotor 33. The preferred embodiment of rotor 33 is a rotor made of sintered iron or other ferrous material, with arcuate slots 43 and radial slot 41 formed by the die that compresses the powered metal to form rotor 33. Holes 47 and 49, of the sizes utilized in the preferred embodiment of the invention, are difficult to fabricate in this manner, because pins disposed on opposite sides of a sintering die of appropriate size might be unduly delicate. It should be apparent that an aperture or recess such as recess 47a need not pass through rotor 33, but need only create a significant disturbance in the flux pattern at the periphery of rotor 33. It should also be apparent that a larger hole 47 or 49 would create a larger disturbance, causing a rate of change of flux in trigger coil 35 sufficient to trigger the ignition system at a lower rotational speed. It should be further apparent that a recess such as 47a which does not pass through the rotor must be of greater diameter to create the same disturbance in flux passing through trigger coil 35. Therefore, appertures or recesses such as holes 47 and 49 may be made larger to maintain the same effect as their depth is made smaller.

Figure 6:
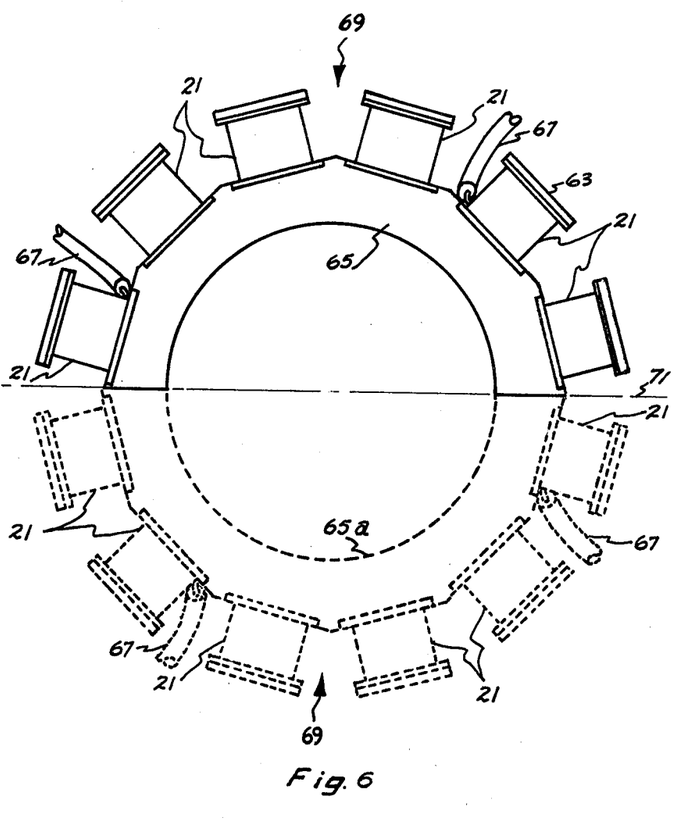
FIG. 6 is a top-elevational view of generating coils according to the present invention.

FIG. 6 illustrates in detail the novel construction of charging coils 21. It should be noted that the statements made below with regard to charging coils 21 apply equally to generating coils 23, which are formed in the same manner. For the embodiment of the invention illustrated, twelve charging coil windings 61 are wound on twelve pole pieces 63 provided on stator 65, using conventional stator-winding equipment, winding identical coils 61 on each pole 63, coils 61 being wound in series, with adjacent coils being wound in opposite directions. Wires 67 are attached at appropriate points, preferably spaced from line 71. Then, stator 65 is simply sawed or cut in two pieces along line 71, forming two six-pole charging winding assemblies 69. The same procedure is followed to make assemblies of generating coils 23. This is in contrast to stator structures used in prior efforts to provide a small engine ignition system where generating windings were seemingly indiscrimently mixed with charging windings, either on separate poles, or one wound over the other. As can be seen, such non-uniform winding is more difficult and timing consuming, and creates a much larger possibility of error, rendering an assembly useless. This also provides a more economical ignition system according to the invention, since generating windings are separate, and need not be provided where not necessary.

Figure 7:
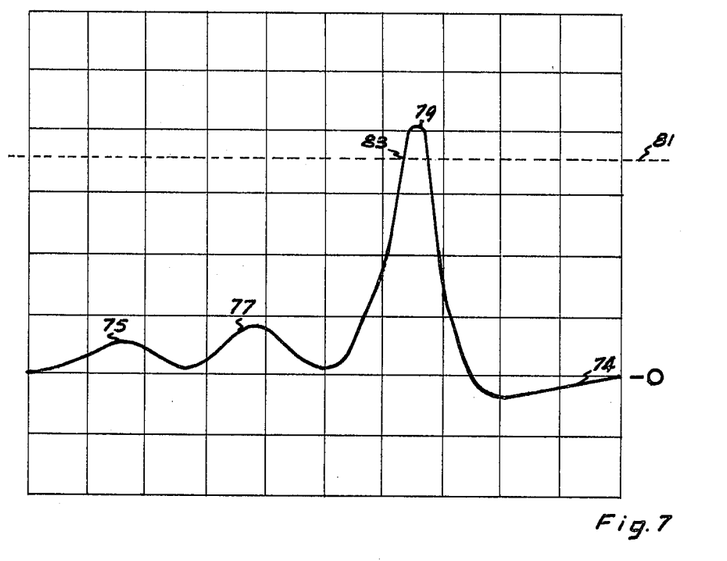
FIG. 7 shows an oscilloscope trace showing the function of the rotor in an engine equipped with an ignition system according to the invention operated at low speed.
Figure 8:
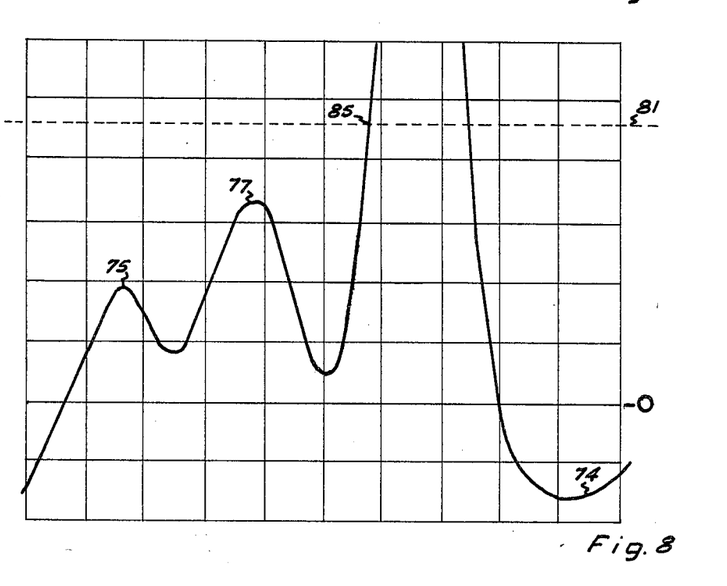
FIG. 8 shows an oscilloscope trace showing the function of the rotor in an engine operated at a higher speed.

FIG. 7 illustrates an oscilloscope trace of the waveform 74 of the voltage across trigger coil 35, connected to an ignition circuit, caused by operation of a shaft 16 at 200 RPM. Voltage peak 75 is caused by the passage of hole 49 past coil 35. Voltage peak 77 is caused by the passage of hole 47 past coil 35. Voltage peak 79 is caused by the flux reversal which occures when radial slot 41 passes coil 35. Voltage peak 79 crosses trigger level 81 at point 83, giving a slight smount of advance above starting timing. Voltage peaks 75 and 77 do not approach the trigger level 81 at this speed. As shown in FIG. 8, voltage peaks 75, 77, and 79 all increase in magnitude as speed of magnetic trigger rotor 33 increases. FIG. 8 shows a waveform to the same scale as that of FIG. 7, with a magnetic trigger rotor speed of 500 RPM. Triggering now occurs at point 85, where voltage peak 79 crosses trigger level 81. This is some ignition advance over the triggering point illustrated in FIG. 7.

Figure 9:
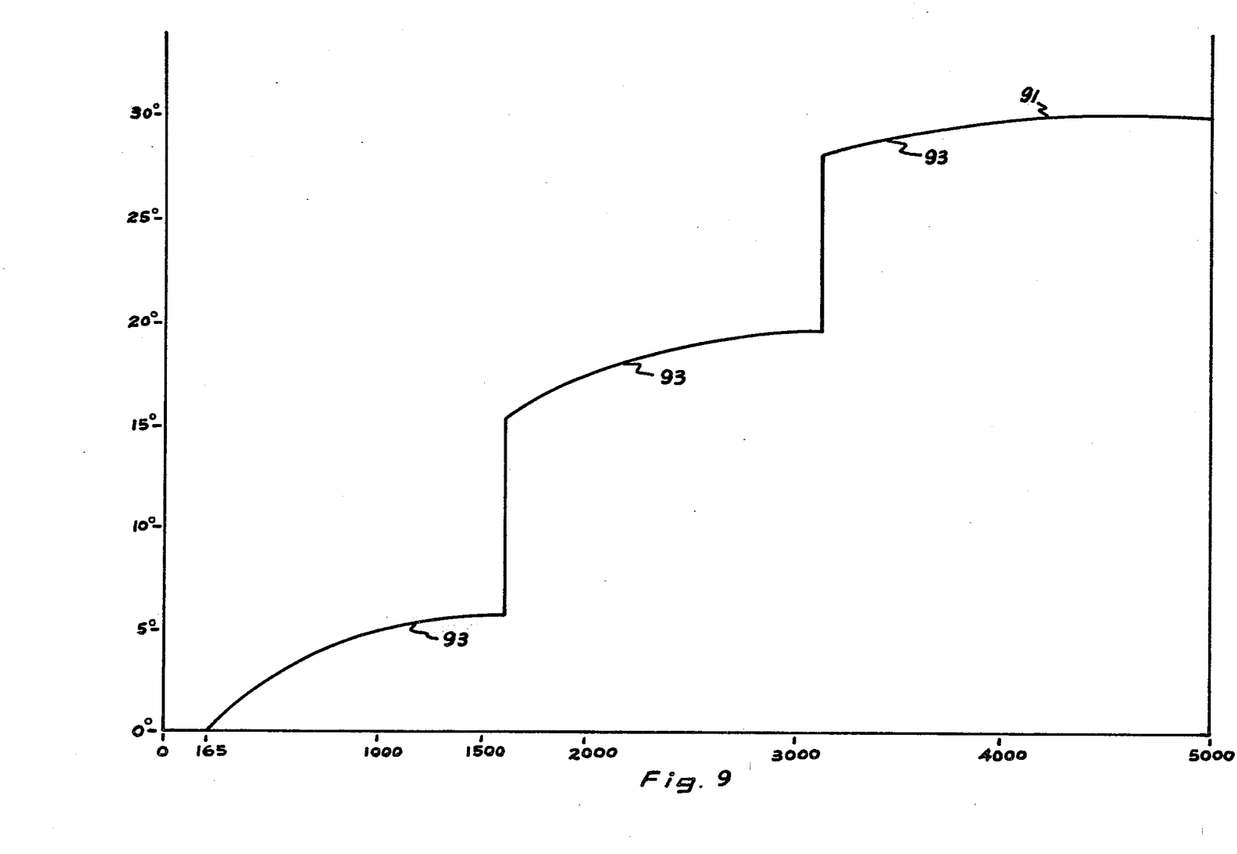
FIG. 9 is a drawing showing the advance curve obtained by use of a rotor according to the invention.

As is apparent from FIG. 9, the waveforms illustrated in FIG. 7 and FIG. 8 continue to increase in magnitude, as magnetic trigger rotor 33 increases in speed, with voltage peak 75 reaching the trigger level 81 at approximately 3000 RPM. As shown by curve 91 in FIG. 9, illustrating the relationship between RPM and ignition advance using the illustrated embodiment of the invention, shows that the advance curve obtained is not a true step advance, but rather has steps with rounded leading edges 93, caused by the differing intercept points of voltage waveform 74 with trigger level 81. It will now be apparent that with suitable selection of the number and spacing and the size and depth of apertures near the periphery of magnetic trigger rotor 33, an advance curve having many of the advantages of a ramp-type advance curve may be accomplished with much simpler structure. It will also be apparent that suitable selection of time constants associated with trigger coil 35 could be made to adjust the width of voltage peaks such as 75, 77 and 79, to widen them and accentuate their rounding effect on edges 93 of advance curve 91, to smooth advance curve 91 to the extent desired.

Figure 10:
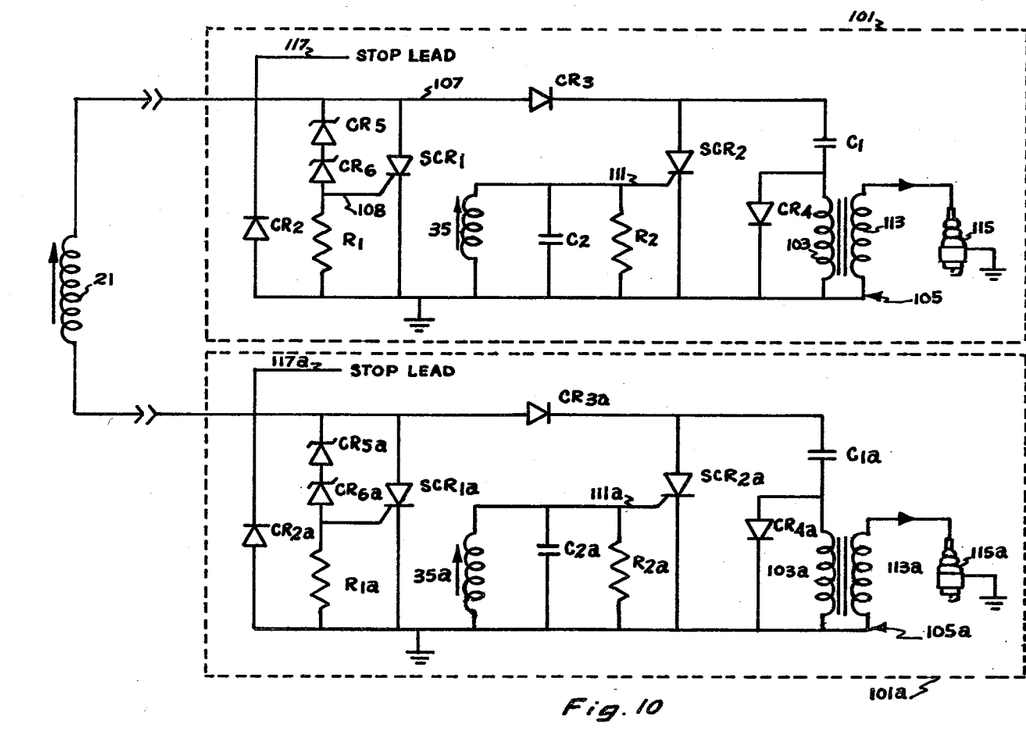
FIG. 10 shows the schematic of a circuit usable with an alternator and ignition timing system according to the invention.

FIG. 10 illustrates an ignition circuit suitable for use with an ignition system according to the invention.

In the preferred embodiment, there are identical ignition circuits 101, and 101a, serving a two-cylinder engine. Obviously, additional such circuits 101 and 101a may be connected in parallel, to serve an engine with a greater number of cylinders. This would also require the addition of triggering coils 35 positioned as appropriate for the desired firing time of a particular cylinder with respect to crankshaft revolution.

As indicated above, charging coils 21 produce an alternating current waveform. From inspection of FIG. 10, it will be apparent that the positive portion of the AC waveform energizes one circuit 101, while the negative portion energizes a second circuit 101a. As illustrated in FIG. 10, the positive portion energizes the upper circuit 101, while the negative portion energizes the lower circuit 101a. When the voltage across charging coils 21 has a positive polarity, current flows through diode CR3, capacitor C1, diode CR4, in parallel with primary 103 of ignition coil 105, to ground 106. The return path is from ground 106 through diode CR2a to coil 21. Zener diodes CR5 and CR6, resistor R1, and silicon controlled rectifier SCR 1 form a voltage regulating circuit. As engine speed increases, the output voltage from charging coils 21 may increase to an undesirable high magnitude. When voltage on line 107 rises above a predetermined level, Zener diodes CR5 and CR6 break down, allowing a voltage to develop across a resistor R1. The voltage across R1 energizes gate lead 108 of rectifier SCR 1, shorting to ground 106 the remainder of the half cycle of voltage generated by charging coils 21. This general type of regulating circuit is called a crowbar regulator. Diodes CR5 and CR6 may be replaced with a single breakdown device having appropriate characteristics, or by a voltage-dependent resistor, if desired.

Trigger coil 35 is connected in parallel with capacitor C2, resistor R2, and gate lead 111 of silicon controlled rectifier SCR 2. Capacitor C2 and resistor R2 form a filter for spurious signals and also set a time constant for trigger coil 35. Resistance R2 also serves to desensitize rectifier SCR 2. When voltage from trigger coil 35 reaches a predetermined point, determined by the trigger voltage of rectifier SCR 2, SCR 2 will conduct. Current then flows from capacitor C1, through rectifier SCR 2, and primary 103 of ignition coil 105. This discharge of capacitor C1 through primary 103 causes a high voltage to appear in secondary 113 of ignition coil 105, causing a spark to appear across the electrodes or spark plug 115. Rectifier CR4, besides serving as a bypass when capacitor C1 is being charged, also serves to dampen ringing of the primary 103 of ignition coil 105 following firing of spark plug 115. The line 117, labeled "Stop Lead", is used to stop an engine with which an ignition system according to the invention is used. When stop lead 117 is connected to ground, voltage from charging coils 21 is connected to ground, and no voltage is available to charge capacitor C1 to provide an ignition pulse through spark plug 115, so that the engine ceases to run. For convenience, components in the ignition circuit 101a in the lower portion of FIG. 10 are marked with numbers similar to those used in FIG. 101, but with a suffix to indicate they are in a separate circuit. Circuit 101a operates in the same manner as circuit 101. It will be apparent that when the AC waveform from charging coils 21 is negative with respect to circuit 101, current will flow through rectifier CR3a, capacitor C1a, rectifier CR4a, in parallel with primary 103a, to ground 106, and returns to charging coil 21 from ground 106 through rectifier CR2 in circuit 101. The remainder of the function of circuit 101a is identical to that of circuit 101.

It will be apparent that numerous modifications, and changes would be possible without departing from the spirit and scope of the instant invention.

We claim:

1. An ignition system for use with a small internal combustion engine having at least one cylinder including a piston therein, comprising:
   ignition means responsive to trigger signals for producing ignition pulses in said cylinder of said engine;
   trigger means for producing said trigger signals in timed relation to the movement of said piston in said cylinder;
   said trigger means including a trigger coil and a magnetic trigger rotor rotated past said trigger coil in synchronism with the movement of said piston for generating a trigger signal in said coil;
   said trigger rotor being formed of a magnetically conductive material, having arcuate slots formed therein, and having first and second magnetic means disposed in said slots;
   said first and second magnetic means being magnetized so that the first magnetic means has a first polarity magnetic pole disposed towards the periphery of said rotor and so that said second magnetic means has a second polarity magnetic pole disposed towards the periphery of said rotor;
   said trigger rotor having a radial slot formed therein between said arcuate slots so that the rotor has a magnetic field which changes polarity across said radial slot to generate a trigger signal of maximum magnitude when said radial slot of said rotor is rotated past said trigger coil for producing a trigger signal effective at relatively low speeds of said engine;
   said trigger rotor further including at least one cylindrical hole formed therein adjacent said radial slot and circumferentially spaced from said radial slot and spaced from the radial periphery of said rotor, said cylindrical hole being formed with its axis parallel to the axis of rotation of said rotor, for distorting said magnetic field and for providing a change in the amount of flux passing through said trigger coil when said cylindrical hole of said rotor is rotated past said trigger coil, to generate a trigger signal which is effective only when said engine has accelerated to a predetermined speed, to provide an advanced ignition pulse.

2. An ignition system according to claim 1, wherein:
   said rotor includes at least two said cylindrical holes circumferentially spaced from said radial slot and from each other for providing at least two advanced trigger signals, each said advanced trigger signal being effective only after said engine has accelerated to a different predetermined speed for providing a multiple step advance for said engine.

3. An ignition system according to claim 1 or 2, wherein:
   said cylindrical hole extends through the thickness of said rotor.

4. An igntion system according to claim 1, wherein:
   said rotor is eccentric, with said radial slot being formed in said rotor at a peripheral position furthest from the axis of rotation of the rotor, to provide an airgap from said trigger coil which varies with the angular position of the rotor.

5. An ignition system according to claim 1, wherein:

said rotor is formed by sintering a ferrous material; and said magnetic means are elastomeric strips filled with a magnetic material.

6. A timing rotor for use in an ignition system including a stationary trigger coil comprising:

an eccentric rotor;

said rotor being formed of a magnetically conductive material;

said rotor having arcuate slots formed therein, and having first and second magnetic means disposed in said slots;

said rotor having a radial slot formed therein between said arcuate slots;

said rotor having at least one cylindrical hole formed therein adjacent said radial slot, and circumferentially spaced from said radial slot and spaced from the radial periphery of said rotor, said cylindrical hole being formed with its axis parallel to an axis of rotation of said rotor and perpendicular to said rotor, for distorting the magnetic field of said first magnetic means;

said magnetic means being magnetized so that said first magnetic means has a first polarity magnetic pole disposed towards the periphery of said rotor and so that said second magnetic means has a second polarity magnetic pole disposed towards the periphery of said rotor, whereby rotating said radial slot of said rotor past said stationary trigger coil causes a reversal of flux in said trigger coil to generate a maximum voltage therein, and rotating said cylindrical hole of said rotor past said coil causes a disturbance in the flux therein, said disturbance generating a smaller voltage therein, said smaller voltage becoming effective as an advanced ignition trigger signal at a predetermined rotational speed of said rotor.

7. A rotor according to claim 6, wherein:

said rotor is formed from a sintered ferrous material and said magnetic means are elastomeric strips filled with a magnetic material.

8. A rotor according to claim 7, wherein:

said rotor includes a plurality of said cylindrical holes, each said cylindrical hole being circumferentially spaced from an adjacent said circular hole.

9. A rotor according to claim 6, 7, or 8 wherein each said cylindrical hole extends through the thickness of said rotor.

10. In an ignition system for an internal combustion engine, of the type including ignition means responsive to trigger signals for producing ignition pulses, trigger means for supplying said pulses including a trigger coil and a magnetic rotor, an improvement comprising:

a plurality of cylindrical holes adjacent spaced from the radial periphery of said rotor formed in said rotor, each said cylindrical hole having its axis parallel to an axis of rotation of said rotor, for providing a change in the amount of flux passing through said trigger coil when each said hole is rotated past said trigger coil to provide a trigger signal which is effective only when said engine has accelerated to a predetermined speed, for providing a multiple step ignition advance for said engine.

11. In an ignition system for an internal combustion engine, of the type including ignition means responsive to trigger signals for producing ignition pulses in a cylinder of said engine, trigger means including a magnetic trigger rotor and a trigger coil for producing said trigger signals in synchronism with the movement of a piston in said cylinder when said rotor is rotated past said coil, said rotor having arcuate slots formed therein and first and second magnetic means disposed in said slots and magnetized so that each said magnetic means disposed in said slots has an opposite polarity magnetic pole disposed toward the periphery of said rotor, the rotor also having a radial slot in said periphery formed between said arcuate slots so that said rotor has a magnetic field which changes polarity across said gap for producing one said trigger signal which is effective at low rotational speeds of said engine, an improvement comprising:

at least one cylindrical hole formed in said rotor adjacent said radial slot, circumferentially spaced from said slot and spaced from the radial periphery of said rotor, and formed with its axis parallel to the axis of rotation of said rotor, for disturbing the magnetic field of said rotor to cause a disturbance in flux through said trigger coil when said rotor is rotated past said coil to generate a voltage which becomes effective as said rotor is rotated past said trigger coil at at least one predetermined speed to cause at least one advanced ignition trigger signal.

* * * * *